(12) United States Patent
Lin et al.

(10) Patent No.: US 8,140,130 B2
(45) Date of Patent: Mar. 20, 2012

(54) ELECTRONIC DEVICE PROVIDED WITH A BATTERY UNIT

(75) Inventors: Chi-Hsiung Lin, Taipei (TW); Tsan-Hsi Lin, Taipei (TW); Wei-Tse Cheng, Taipei (TW)

(73) Assignee: Inventec Appliances Corp., Taipei (TW)

( * ) Notice: Subject to any disclaimer, the term of this patent is extended or adjusted under 35 U.S.C. 154(b) by 614 days.

(21) Appl. No.: 12/342,892

(22) Filed: Dec. 23, 2008

(65) Prior Publication Data

US 2009/0209299 A1    Aug. 20, 2009

(30) Foreign Application Priority Data

Feb. 20, 2008   (TW) ................................ 97105950 A

(51) Int. Cl.
   *H04B 1/38*   (2006.01)
(52) U.S. Cl. ......... 455/572; 320/112; 320/114; 320/135
(58) Field of Classification Search .................... 455/572
    See application file for complete search history.

(56) References Cited

U.S. PATENT DOCUMENTS

| | | | | |
|---|---|---|---|---|
| 5,596,487 | A * | 1/1997 | Castaneda et al. | 361/814 |
| 7,787,255 | B2 * | 8/2010 | Tsai et al. | 361/753 |
| 7,801,577 | B2 * | 9/2010 | Lee | 455/575.1 |

* cited by examiner

*Primary Examiner* — Khai M Nguyen
(74) *Attorney, Agent, or Firm* — Muncy, Geissler, Olds & Lowe, PLLC

(57) ABSTRACT

An electronic device includes a printed circuit board having a first ground contact and a second ground contact; an antenna unit having a ground contact end coupled to the first ground contact of the printed circuit board; and a battery unit. The battery unit includes a cell body, a cell cover having an internal surface defining a first chamber for confining the cell body therein and an external surface defining a second chamber that projects from the first chamber. The cell cover is connected electrically to the second ground contact of the printed circuit board. A protection printed circuit board is contained within the second chamber in such a manner to electrically connect with the cell cover. An electric coupler interconnects the protection printed circuit board to the first ground contact of the printed circuit board.

8 Claims, 2 Drawing Sheets

| Frequency | CHECK 1 | CHECK 2 | TEST 1 | TEST 2 |
|---|---|---|---|---|
| 824 MHz | 35 | 24 | 56 | 52 |
| 851 MHz | 35 | 25 | 67 | 71 |
| 878.4 MHz | 34 | 27 | 71 | 79 |
| 905.6 MHz | 35 | 30 | 64 | 73 |
| 932.8 MHz | 45 | 30 | 58 | 62 |
| 960 MHz | 44 | 31 | 38 | 33 |
| average | 38 | 28 | 59 | 62 |
| 1710 MHz | 21 | 40 | 29 | 30 |
| 1745 MHz | 38 | 58 | 36 | 56 |
| 1785 MHz | 52 | 62 | 38 | 64 |
| 1805 MHz | 57 | 62 | 36 | 64 |
| 1840 MHz | 41 | 52 | 30 | 53 |
| 1845 MHz | 41 | 51 | 31 | 52 |
| 1920 MHz | 38 | 55 | 31 | 57 |
| 1950 MHz | 51 | 48 | 40 | 45 |
| 1980 MHz | 34 | 46 | 34 | 45 |
| 2110 MHz | 47 | 32 | 34 | 18 |
| 2140 MHz | 23 | 31 | 35 | 46 |
| 2170 MHz | 30 | 32 | 34 | 34 |
| average | 39 | 47 | 34 | 47 |

Figure.3

ELECTRONIC DEVICE PROVIDED WITH A BATTERY UNIT

This application claims the benefit of the Taiwan Patent Application Serial NO. 097105950, filed on Feb. 20, 2008, the subject matter of which is incorporated herein by reference.

BACKGROUND OF THE INVENTION

1. Field of the Invention

The present invention relates to an electronic device, more particularly to an electronic device that has an antenna unit and a battery unit with a new design such that the new design battery unit can lower the coupling effect between the antenna unit and the battery unit.

2. Description of the Prior Art

Referring to FIG. 1, a conventional electronic device (such as a mobile phone) is shown to include a printed circuit board 110, an antenna unit 120 and a battery unit 130.

The printed circuit board 110 has a ground contact 111. The antenna unit 120 has a ground contact terminal 121 coupled electrically to the ground contact 111 of the printed circuit board 110. The battery unit 130 includes a cell body 131, a cell cover 132, a protection printed circuit board 133 and an electric connector.

The cell cover 132 is made from plastic materials, is in electrical contact with the printed circuit board 110, and defines a first chamber for encapsulating the cell body 131 and a second chamber H1 adjacent to the first chamber. The plastic materials can insulate the printed circuit board 110 from the cell body 131 so that the function of the printed circuit board 110 will not be affected or interrupted by the electromagnetic field resulted from the current flow during the charging or discharging operation of the cell body 131. The protection printed circuit board 133 is disposed in the second chamber H1 in such a manner to contact with the cell cover 132 while the electric connector interconnects the protection printed circuit board 133 to the ground contact 111 of the printed circuit board 110. The electric connector can be a ground contact terminal 134 for coupling electrically to the ground contact 111 of the printed circuit board 110 so that the accumulated electric charge can be guided to the ground to prevent the noise disturbance. Therefore, any electronic device (such as motors, amplifiers and digital cameras) having metal casing or elements should be grounded.

The conventional electronic device has a single ground contact 111 and its surface area is too small to discharge the load effectively so that electric charge will be accumulated at the cell body 131 and the antenna unit 120, thereby causing the coupling effect to interfere the signal receiving. Under this condition, the function ability of the electronic device is decreased due to signal interference. Therefore, the position of the antenna unit 120 as well as the battery unit 130 and whether their coupling method may result in interactive coupling effect should be reconsidered by the manufacturers. In comparative words, the restriction in the coupling among the electronic components will be lowered and the interference consequently reduced in case the ground contact of the device is well planned.

Therefore the present invention is to provide a new design for a battery unit that is applicable to be implemented in an electronic device.

SUMMARY OF THE INVENTION

One aspect of the present invention is to provide an electronic device having a battery unit including an extra ground contact to lower the coupling effect in the electronic device.

The electronic device of the present invention includes a printed circuit board, an antenna unit and a battery unit.

The printed circuit board has a first second ground contact and a second ground contact. The antenna unit has a ground contact end coupled electrically to the first ground contact of the printed circuit board. The battery unit includes a cell body, a cell cover, a protection printed circuit board and an electric coupler.

The cell cover has an internal surface defining a first chamber for containing the cell body therein and an external surface defining a second chamber that projects from the first chamber. The cell cover is further electrically connected to the second ground contact of the printed circuit board via a flexible conductive strip. The protection printed circuit board is contained within the second chamber in such a manner to electrically connect with the cell cover to prevent the cell body from over charge or discharge, or to prevent occurrence of short circuit of the circuit path in the device. The electric coupler interconnects the protection printed circuit board to the first ground contact of the printed circuit board. The electric coupler has a ground contact terminal coupled electrically to the first ground contact of the printed circuit board.

The electronic device of the present invention has an extra ground contact when compared to the prior art ones for discharging the electric charge accumulated at the cell body and the antenna unit. Due to increase in the total area of the ground contact, the coupling effect of the electronic device of the present invention can be greatly lowered.

BRIEF DESCRIPTION OF THE DRAWINGS

Other features and advantages of this invention will become more apparent in the following detailed description of the preferred embodiment of this invention, with reference to the accompanying drawings, in which:

FIG. 3 shows a table including data (antenna gain) resulted from an experiment conducted under different frequency of the electronic device of the present invention with respect to the prior art ones.

DETAILED DESCRIPTIONS OF THE PREFERRED EMBODIMENT

Figure 2:
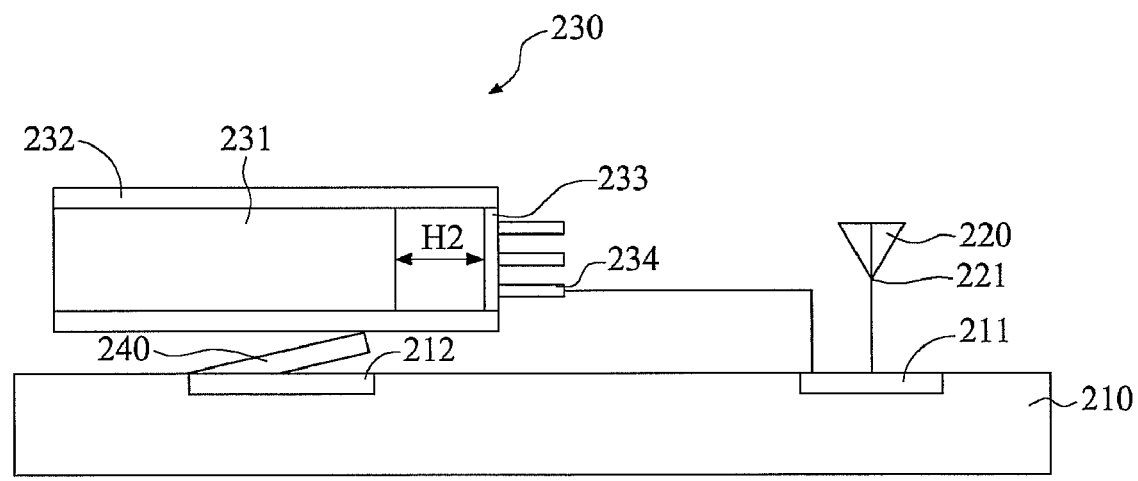
FIG. 2 is a schematic view of one embodiment of an electronic device of the present invention having a battery unit.

FIG. 2 is a schematic view of one embodiment of an electronic device of the present invention. The electronic device includes a printed circuit board 210, an antenna unit 220 and a battery unit 230. The electronic device can be a mobile phone, a PDA, or a PDA phone, the restriction should not be limited thereto.

The printed circuit board 210 has a first ground contact 211 and a second ground contact, 212. The antenna unit 220 has a ground contact end 221 coupled electrically to the first ground contact 211 of the printed circuit board 210. The battery unit 230 includes a cell body 231, a cell cover 232, a protection printed circuit board 233 and an electric coupler.

A lithium battery serves as the cell body 231 in this embodiment. The cell cover 232 has an internal surface defining a first chamber for containing the cell body 231 therein and an external surface defining a second chamber H2 that projects outwardly and radially from the first chamber. The cell cover 232 is further electrically connected to the second ground contact 212 of the printed circuit board 210 via a flexible conductive strip 240 such that the cell cover 232 is grounded. The cell cover 232 is made from metal materials while the flexible conductive strip 240 is made from conductive materials so that the excessive electric charge is guided to the second ground contact 212 of the printed circuit board 210 such that the function of the printed circuit board 210 will not be affected or interrupted by the electromagnetic field resulted from the current flow during the charging or discharging operation of the cell body 231. The protection printed circuit board 233 is contained within the second chamber H2 in such a manner to electrically connect with the cell cover 232 so as to prevent the cell body 231 from over charge/discharge or to prevent occurrence of the short circuit. The electric coupler is made from conductive materials and is capable of interconnecting the protection printed circuit board 233 to the first ground contact 211 of the printed circuit board 210. The electric coupler may have a ground contact terminal 234 coupled electrically to the first ground contact 211 of the printed circuit board 210.

Figure 1:
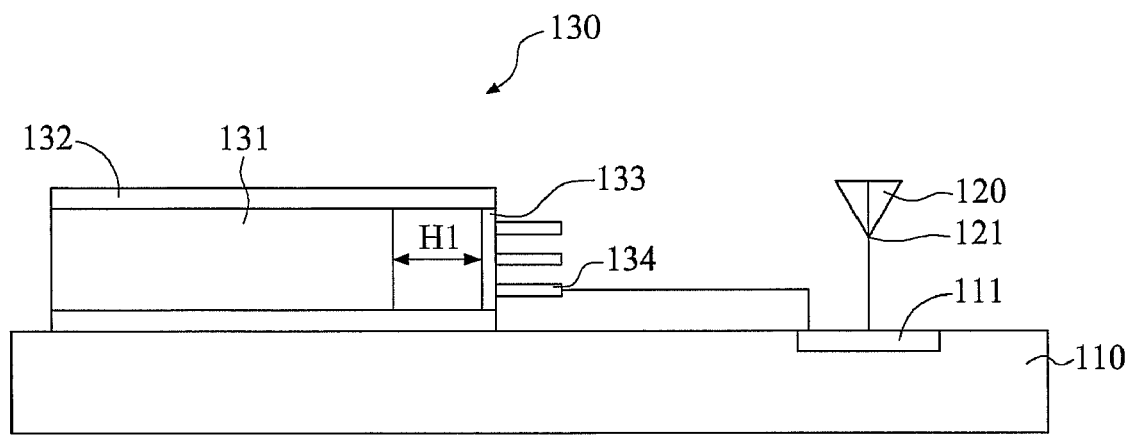
FIG. 1 is a schematic view of a conventional electronic device provided with a battery unit.

Note that the electronic device of the prior art has a single ground contact 111 for connecting electrically and simultaneously to the cell cover 131 (see FIG. 1) and the antenna unit 120 such that a relatively large electric charge is resulted. Thus after assembly, there always exist the coupling effect among the electronic components. However, the electronic device of the present invention has an extra ground contact 212 that can discharge the accumulated electric charge from the cell body 231 and a portion of the electric charge from the antenna unit 220 due to increase of the contact area, thereby greatly reducing the coupling effect and lowering the interference in the signal receiving ability and noise disturbance. Thus, the restriction in the coupling between the antenna unit 220 and the battery unit 230 is consequently reduced, thereby providing more variation in the coupling position of the electronic components.

FIG. 3 shows a table including data (antenna gain) resulted from an experiment conducted under different frequency of the electronic device of the present invention with respect to the prior art ones. The higher the value rises, the better the antenna gain becomes. In other words, high antenna gain means that the electronic device possesses fine signal receiving ability.

First and second columns respectively show the result of the conventional electronic device of the prior art having a single ground contact, wherein [Check 1] and [Check 2] respectively denote the columns 1 and 2. From the second column, when the electronic device is working with the frequency smaller than 1000 MHz, the average antenna gain values are 38 and 28. When the electronic device is working with the frequency higher than 1000 MHz, the average antenna gain values are 39 and 47. Third and fourth columns respectively show the result of the present electronic device having two ground contacts, wherein [Test 1] and [Test 2] respectively denote the columns 3 and 4. From the columns 3 and 4, it is observed that when the present electronic device is working with the frequency smaller than 1000 MHz, the average antenna gain values are 59 and 62. When the present electronic device is working with the frequency higher than 1000 MHz, the average antenna gain values are 34 and 47.

From the above-mentioned table, one can note that the antenna gain of the present electronic device is increased tremendously when working under 1000 MHz frequency, which means that the signal receiving ability of the device is greatly enhanced. When the present electronic device is working above 1000 MHz frequency, the variation of the antenna gain is not apparent. In conclusion, the new design of the battery unit of the present invention is intended for the electronic device working under 1000 MHz frequency to enhance its signal receiving ability.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic device comprising:
    a printed circuit board having a first ground contact and a second ground contact;
    an antenna unit having a ground contact end coupled to said first ground contact of said printed circuit board; and
    a battery unit including
        a cell body,
        a cell cover having an internal surface defining a first chamber for containing said cell body therein and an external surface defining a second chamber projecting from said first chamber, said cell cover being electrically connected to said second ground contact of said printed circuit board, and
        a protection printed circuit board contained within said second chamber in such a manner to electrically connect with said cell cover;
        an electric coupler interconnecting said protection printed circuit board to said first ground contact of said printed circuit board; and
        a flexible conductive strip, said cell cover being connected electrically to said second ground contact of said printed circuit board via said flexible conductive strip.

2. The electronic device according to claim 1, wherein said cell body is a lithium battery.

3. The electronic device according to claim 1, wherein said cell cover is made from metal materials.

4. The electronic device according to claim 1, wherein said electric coupler is made from conductive materials.

5. The electronic device according to claim 1, wherein said electric coupler has a ground contact terminal coupled electrically to said first ground contact of said printed circuit board.

6. The electronic device according to claim 1, wherein the electronic device is a mobile phone.

7. The electronic device according to claim 1, wherein the electronic device is a PDA (Personal Digital Assistant).

8. The electronic device according to claim 1, wherein the electronic device is a PDA phone.

* * * * *